United States Patent [19]
Nakajima et al.

[11] 3,923,978
[45] Dec. 2, 1975

[54] GATAVALIN AND PROCESS FOR PRODUCING SAME

[75] Inventors: Nobuhiro Nakajima, Fujimi; Shiro Nakatsugawa, Tokyo; Yasuo Koyama, Tokyo; Shiro Chihara, Tokyo, all of Japan

[73] Assignee: Kayaku Antibiotic Research Co., Ltd., Tokyo, Japan

[22] Filed: Oct. 17, 1972

[21] Appl. No.: 298,377

[52] U.S. Cl. .................................. 424/118; 195/80
[51] Int. Cl.² ........................................ A61K 35/00
[58] Field of Search ...................... 424/118; 195/80

[56] References Cited
OTHER PUBLICATIONS

Miller, The Pfizer Handbook of Microbial Metabolites, McGraw–Hill Book Co., Inc., 1961, N.Y., N.Y., pp. 373–375.

*Primary Examiner*—Jerome D. Goldberg
*Attorney, Agent, or Firm*—Oblon, Fisher, Spivak, McClelland & Maier

[57] ABSTRACT

An antibiotic substance designated as gatavalin is produced by cultivating a strain of *Bacillus polymyxa subsp. colistinus* KOYAMA, and isolating and recovering the gatavalin from the cultured broth.

2 Claims, 1 Drawing Figure

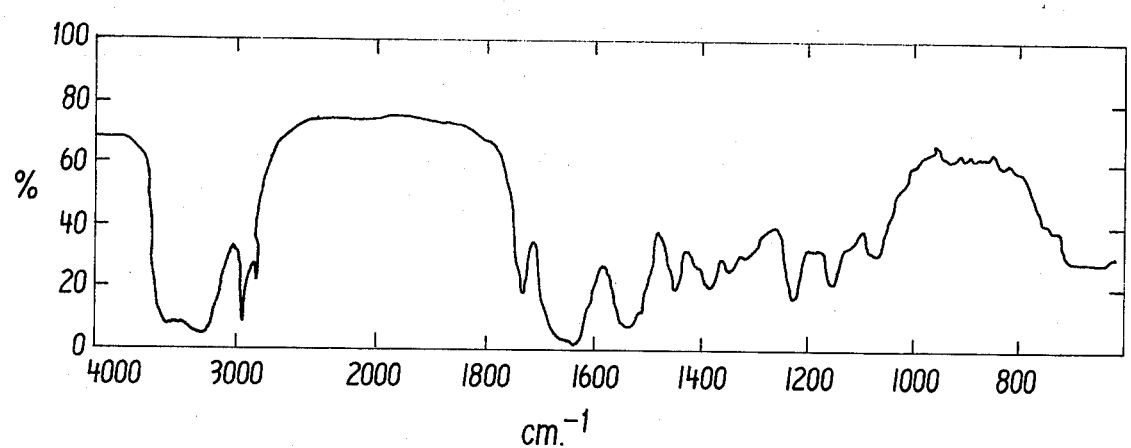

GATAVALIN AND PROCESS FOR PRODUCING SAME

BACKGROUND OF THE INVENTION

1. Field Of The Invention

This invention relates to a new and useful antibiotic substance called gatavalin and to its production.

2. Description Of The Prior Art

Heretofore, cultured broths containing colistin have been obtained by the fermentation of *Bacillus polymyxa subsp. colistinus* KOYAMA. The broth exhibits an excellent antibiotic effect against Gram-negative bacteria. It has now been found that the fermentation of *Bacillus polymyxa subsp. colistinus* KOYAMA produces a new antibiotic which exhibits a different antimicrobial spectrum than that of colistin. This antibiotic substance has been designated as "gatavalin."

SUMMARY OF THE INVENTION

Accordingly, one object of the present invention is to provide a new antibiotic substance.

Another object of the present invention is to provide a process for isolating and recovering gatavalin.

These and other objects of the invention have been attained by fermentating *Bacillus polymyxa subsp. colistinus* KOYAMA, ATCC No. 21830, and collecting the gatavalin produced.

DESCRIPTION OF THE DRAWING

FIG. 1 is an infrared spectrum of gatavalin.

DESCRIPTION OF THE PREFERRED EMBODIMENTS

*Bacillus polymyxa subsp.colistinus* KOYAMA used in the present invention has the following properties:

Rods:
0.9 — 1.1 × 4.5 — 4.6 $\mu$, motile, gram-positive
1.0 — 1.2 × 1.2 — 1.5 $\mu$, ellipsoidal, central Gelatin stab: Liquefaction Glucose agar slant: Growth good, raised, glistening, gummy, with production of gas, translucent, lobate margin.

Glucose nitrate agar: Good growth, gummy.

Broth: Turbidity uniform, gummy sediment.

NaCl broth: No growth in 5 percent NaCl.

Milk: Coagulated with the production of gas, casein hydrolyzed.

Potato: Growth abundant, slimy, yellowish-brown, potato decomposed with the production of gas.

Indole: Not produced.

Utilization of carbon sources:

| Arabinose | + | Celobiose | + | Fructose | + | Galactose | + |
|---|---|---|---|---|---|---|---|
| Inulin | − | Lactose | + | Maltose | + | Mannose | + |
| Rhamnose | − | Sorbose | − | Sucrose | + | Salicin | − |
| Xylose | + | Adonitol | − | Dulcitol | − | Erythritol | − |
| Inocitol | − | Mannitol | + | Sorbitol | − | Citrate | − |
| Acetate | − | Succinate | − | Tartrate | − | | |

Starch: Hydrolyzed

Acetylmethylcarbinol is produced.

Nitrites produced from nitrates.

Biotin necessary for growth.

Antibiotics production:
  Colistin, Gatavalin, Jolipeptin.

The cultured broth used in the present invention is prepared by the ordinary methods used for the production of colistin. A variety of materials can be used in the culture medium as the nutritive source. Preferable materials containing sources of nitrogen include peptone, wheat bran, wheat flour, corn steep liquor, meat extract, protein hydrolates, inorganic nitrate, ammonium salts or the like. A carbon source should also be present, such as dextrose, lactose, maltose, starch, glycerine, molasses or the like, and should be used in comparatively large quantities. If desired, various inorganic salts, assistants and the like can also be added. In order to provide a culture medium containing the above-described nutritive substances on a large scale, it is advantageous to use a submerged culture. The culture temperature should be about 28° to 35°C. The initial pH of the culture medium should be about pH 7.

Since the gatavalin is chiefly produced in cells, only the cells may be separated from the cultured broth and used.

In practicing this invention, the cultured broth or an aqueous suspension of the cells are made acidic, preferably pH 2 to 5, by adding an acid such as hydrochloric acid, sulfuric acid, and the like. Subsequently, the treated material is heated, if necessary. By this treatment, the gatavalin in the cells is set free and migrates to the outside of the cells. Although the gatavalin is free to migrate only when the cell suspension or cultured broth is made acidic and stirred, this process can be accelerated by heating at temperatures from 50° to 80°C. for 5 to 30 minutes.

The solution containing the gatavalin treated in the prescribed manner was extracted with an organic solvent which is immiscible with water and which dissolves the gatavalin. Suitable solvents include butyl alcohol, isoamyl alcohol, chloroform, and the like. The organic solvent is preferably used in an amount which is one-third the volume of the mother liquid. By this treatment, all of the gatavalin is dissolved in the organic solvent, and the colistin remains in the mother liquid. Thus, a selective separation of the gatavalin is achieved.

In order to separate the gatavalin from the extract, the extract is concentrated under reduced pressure to approximately one-half its original volume. Thereafter the gatavalin is precipitated by adding a gatavalin-insoluble solvent, such as ether, ethyl acetate, butyl acetate or acetone. Although the amount of the gatavalin-insoluble solvent added is dependent upon the concentration of gatavalin in the extract and the solvent used, it is ordinarily added in an amount one to three times the volume of the extract.

The gatavalin obtained by this treatment still contains some impurities, but it may be purified, for example, by dissolving the crude gatavalin in a mixture of butyl alcohol-methyl alcohol-water (1 : 2 : 1), treating with activated alumina, and concentrating the solution. The concentrated solution is subsequently treated with a gatavalin-insoluble solvent to precipitate pure gatavalin.

PROPERTIES OF GATAVALIN:

1. Neutral substance
2. Molecular weight: abaout 2,000
3. Stability:
   Stable in acidic conditions and unstable in alkaline conditions. Stable when heated at 100°C. for 30 minutes at pH 3. Stable for more than one week in a cold aqueous solution.
4. Ultraviolet absorption: end absorption.

5. Solubilities:
   Soluble in dimethyl sulfoxide, acetic acid, ethyleneglycol, methanol and ethanol, slightly soluble in water, and insoluble in diethylether, butyl acetate, benzene and acetone.
6. Color reactions:
   Ninhydrin reaction (−), Ninhydrin reaction (after hydrolysis with acid) (+), Biuret reaction (+), Tert.-butyl hypochlorite (+), Fehling reaction (−), Molisch reaction (−).
7. Bioautography on agar plate seeding St. aurens:
   n-butanol : acetic acid : water = 3 : 1 : 1
   Rf = 0.9 ~ 0.95
8. Amino acids composition:

| Glutamic acid | 1 (mol) |
|---|---|
| Aspartic acid | 1 |
| Alanine | 2 |
| Valine | 3 |
| Threonine | 3 |

9. Melting point:
   245 – 248°C.
10. Elementary analysis:
    C 51.19%, H 8.19%, N, 14.16%
11. Infrared absorption spectrum:
    3300, 2900, 1740, 1620, 1520, 1220, 1150 cm$^{-1}$ (FIG. 1).
12. Specific rotation;
    $[\alpha]_D^{23}$ +22.4° (C : 6.5 percent in 50 percent methanol)

Antimicrobial spectrum

| Organism | Minimum inhibitory concentration (mcg/ml) |
|---|---|
| Bacillus subtilis | 1.25 |
| Bacillus cereus | 2.5 |
| Staphylococcus aureus | 0.625 |
| Staphylococcus aureus (Mac-R*) | 0.625 |
| Sarcina lutea | 0.625 |
| Brevibacterium ammoniagenes | 1.25 |
| Micrococcus lysodeikticus | 0.312 |
| Mycobacterium 607 | 0.625 |
| Escherichia coli | 100 |
| Pseudomonas aeruginosa | 100 |
| Proteus mirabilis | 100 |
| Proteus rettgeri | 100 |
| Aerobacter aerogenes | 100 |
| Achromobacter liquidum | 100 |
| Flavobacterium sulfureum | 100 |
| Serratia marcescens | 100 |
| Xanthomonas oryzae | 100 |
| Candida krusei | 10 |
| Candida pseudotropicalis | 0.625 |
| Saccharomyces cerevisiae | 5 |
| Aspergillus oryzae | 5 |
| Aspergillus niger | 1.25 |
| Penicillium expansum | 1.25 |
| Absidia butterri | 2.5 |
| Fusarium sp. | 1.25 |

Toxicities (intraperitoneal administration)
Mouse: $LD_{50}$ : 22.5 mg/K
Rat: $LD_{50}$ : >50 mg/K Having generally described the invention, a more complete understanding can be obtained by reference to certain specific examples which are provided herein for purposes of illustration only and are not intended to be limiting unless otherwise specified.

Production of gatavalin

EXAMPLE 1

Two liters of a 24-hour culture of *Bacillus polymyxa subsp. colistinus* KOYAMA grown at 30°C. in a reciprocal shaker were used to inoculate a 500-liter fermenter containing 200 liters of a growth medium. Incubation of the culture was continued at 30°C. for 24 hours with adequate aeration. The growth medium contained 10 g starch, 5 g $(NH_4)_2SO_4$, 0.5 g $MgSO_4.7H_2O$, 0.5 g $KH_2PO_4$, 3 g $CaCO_3$, 0.5 g NaCl, 150 mcg $MnSO_4$ and 10 mcg biotin per liter; pH 7.0.

Isolation of gatavalin

EXAMPLE 2

A 200 liter quantity of the cultured broth produced as described was centrifugally separated into a layer of cells and a supernatant layer. Only the cells were isolated. The cells were suspended in 20 liters of water, and the suspension was adjusted to pH 3 with hydrochloric acid. The suspension was heated at 70°C. for 10 to 15 minutes, and centrifugally separated into a layer of cells and a supernatant layer which contained gatavalin. To the supernatant were added 10 liters of n-butanol with stirring to extract the gatavalin. The n-butanol layer was concentrated to 5 liters under reduced pressure, and 10 liters of ether were added to the residue to precipitate the gatavalin. The precipitate was collected by filtration and dried to yield crude gatavalin (yield: 80 g). A 20 g quantity of crude gatavalin was dissolved in one liter of a mixture of butanol, methanol and water (1 : 2 : 1 ), and all insoluble matter was removed. The filtrate was passed through an alumina column which was packed with 40 g of activated alumina. The effluent was concentrated to 100 ml. under reduced pressure at 50° to 60°C., and 300 ml of ether was added to the residue. The precipitated white powder was collected to yield 3 g of pure gatavalin.

EXAMPLE 3

Three hundred liters of a cultured broth was acidified to pH 3.0 with 4N-hydrochloric acid, heated at 80°C. for 10 minutes, and filtered. After cooling to 20°C., the filtrate was further acidified to pH 1.0 with 4N-hydrochloric acid. To the acidified filtrate were added 100 liters of n-butanol with stirring for one hour to extract the gatavalin. The butanol layer was concentrated to a volume of 10 liters under reduced pressure. Gatavalin was precipitated by the addition of 3 volume of ethylether. A 100 g amount of the precipitated and dried powder (crude gatavalin), was dissolved in 5 liters of 50 percent methanol, adjusted to pH 4.0 with N-hydrochloric acid, and passed through an alumina column (30 × 500 mm) which was packed with 200 g of activated alumina. The effluent was concentrated under reduced pressure to a volume of 3 liters, and gatavalin was extracted with 3 liters of n-butanol. The butanol layer containing gatavalin was concentrated under reduced pressure to one-half its original volume, and gatavalin was precipitated by the addition of ethylether. A 20 g. amount of a white powder of gatavalin was obtained by this procedure. For further purification, the white powder was dissolved in 50 percent methanol and passed through a Sephadex LH 20 column. The eluted solution was concentrated under reduced pressure, and treated with ethylether to yield 15.5 g of pure gatavalin.

Having now fully described the invention, it will be apparent to one of ordinary skill in the art that many changes and modifications can be made thereto without departing from the spirit or scope of the invention as set forth herein. ACCORDINGLY,

What is claimed as new and intended to be covered by letters Patent is:

1. Gatavalin having the following characteristic properties:

Molecular weight: about 2,000

Melting point: 245°~248°C.

Elementary analysis: C 51.19 percent, H 8.19 percent, N 14.16 percent Amino acids composition: glutamic acid (1 mol), aspartic acid (1 mol), alanine (2 mol), valine (3 mol), threonine (3 mol)

Infrared absorption spectrum: 3300, 2900, 1740, 1620 1520, 1220, 1150 cm$^{-1}$

Specific rotation: $[\alpha]_D^{23} + 22.4°$ (C : 6.5 percent in 50 percent methanol)

Bioautography: Rf = 0.9~0.95 (n-butanol: acetic acid: water = 3 : 1 : 1 )

Ultraviolet: end absorption

Color reaction: Positive to biuret and tert-butyl hypochlorite, negative to ninhydrin, Fehling's solution and Molisch.

2. A process of producing an antibiotic substance designated as gatavalin which comprises cultivating a strain of *Bacillus polymyxa subsp. colistinus* KOYAMA ATCC No. 21830, in a broth at a temperature of about 28° to 35°C and having an initial pH of about 7 for a sufficient time to produce a cultured broth containing gatavalin.

* * * * *